Patented July 2, 1946

2,402,954

UNITED STATES PATENT OFFICE 2,402,954

SEPARATION OF ISOMERIC PARAFFINS

Alfred W. Francis, Woodbury, N. J., assignor to Socony-Vacuum Oil Company, Incorporated, a corporation of New York No Drawing. Application April 30, 1943,
Serial No. 485,153

8 Claims. (Cl. 260—676)

This invention has to do with the separation, by methods of solvent refining, of isomeric branch chained hydrocarbons of paraffinic nature from related straight chain or less highly branched paraffinic compounds.

Recent processes of hydrocarbon conversion, such as alkylation, isomerization, and the like give hydrocarbon mixtures which are almost entirely paraffinic, but contain both straight chain and branched isomeric compounds. Some crudes, by straight distillation, give rise to similar mixtures. Some separation may be effected by carefully conducted close fractional distillation, but this may produce mixtures containing two or more paraffin hydrocarbons boiling so close together that it is impractical to separate them further by fractionation alone, and the components of such mixtures sometimes differ in the degree of branching and therefore in anti-knock value, so that it is desirable to separate them further.

For example, in the preparation of triptane, an extremely valuable anti-knock ingredient, which is a heptane, the product may include other heptanes and there can be separated, by closely controlled fractionation, a cut containing triptane (2,2,3-trimethyl butane), boiling at 80.88° C., 2,2-dimethyl pentane boiling at 79.22° C., and 2,4-dimethyl pentane boiling at 80.6° C. Obviously further separation by fractionation is quite difficult; yet triptane is so much the best anti-knock agent of the three that its separation or at least concentration is of considerable importance.

Ordinary selective solvent refining agents are quite incapable of application to this problem. For example with aniline, using the critical solution temperature with each hydrocarbon as a measure of the selective solvent capability of aniline for that hydrocarbon, we find the following:

Table I

| Branches | Mean of reported C. S. T. with aniline |
|---|---|
| HEPTANES | |
| 0 | 70.6 |
| 1 | 70.0 |
| 2 | 73.5 |
| 3 | 72.2 |
| OCTANES | |
| 0 | 72.1 |
| 1 | 71.6 |
| 2 | 71.6 |
| 3 | 71.6 |

Obviously, with no greater differences in C. S. T's for the various hydrocarbons than these, no effective selectivity is available. Nitrobenzene exhibits similar lack of useful selectivity, as does furfural, and sulfur dioxide has been found almost completely indifferent to differences in structure of saturated hydrocarbons. Similarly, most of the known selective solvent refining agents are useless, particularly the organic solvents of cyclic nature.

I have found that a certain class of organic solvents may be so used, however, and it is therefore the principal object of this invention to provide solvent refining methods for preferential selection among the members of a group of saturated paraffinic isomers of different degrees of branched-chain constitution. A particular object is the provision of a process for selective solvent separation of triptane from mixture with its isomers.

This invention is based upon the discovery that the desired separation may be effected by use of acyclic organic solvent reagents, most of which are miscible with or at least fairly soluble in water, relatively poor in selectivity for aromatic hydrocarbons, and usually possessed of high dielectric constants.

Among those reagents which are found useful are methanol, carbitol, ethyl sulphate, methyl cellosolve, acetic anhydride, acetonitrile, methyl carbitol, ethylene chlorhydrin, nitromethane, and others.

Exemplary of the difference between these solvents and more usual solvent refining agents, the data of Table II, below, may be compared with the data of Table I.

Table II

| Heptane | C. S. T. with— | | |
|---|---|---|---|
| | Methanol | Carbitol | Ethyl sulfate |
| | ° C. | ° C. | ° C. |
| n-Heptane | 51 | 35 | 70 |
| 2,2-dimethylpentane | 40 | 30 | 65 |
| 2,3 dimethylpentane | 37 | 22 | 61 |
| 2,4 dimethylpentane | 40 | 30 | 65 |
| 2,2,3 trimethylbutane (triptane) | 32 | 17 | 56 |

Obviously these reagents will be capable of effecting a reasonably good separation of triptane from its isomers.

With these solvents the critical solution temperature is nearly a linear function of the number of branches, so that the solvent dissolves by preference those paraffin isomers with more branches, which are higher in anti-knock value.

Not all acyclic solvents, even though soluble in water, are suitable for this purpose, however, since some, such as acetic acid, acetone, and ethanol, are completely miscible with heptanes at ordinary temperatures. Others such as formic acid, glycol, glycerol, and the ethanol-amines have such slight solubility for paraffins that they cannot be used. For a suitable degree of solubility the critical solution temperature should be at least 20° C. and preferably not more than 100° C. above the extraction temperature. Other factors such as cost, availability, melting point, boiling point, density, viscosity, stability and toxicity may be important in selecting the solvent most suitable for a particular case.

The solvents tried and found suitable for extracting more highly branched paraffins from mixtures with less highly branched paraffins are given in the following table. The last column, headed $\beta$, is the relative solubility by volume of triptane as compared with 2,4-dimethyl pentane or 2,2-dimethylpentane since this is a typical group of isomers boiling so close together (80.88° C., 80.6° C., and 79.22° C.) that they cannot be separated readily by fractional distillation.

*Table III*

| Solvent | M. P. | B. P. | $d_4^{20}$ | Sol'y in water (percent) | Triptane dissolved by volume at— | | $\beta$ |
|---|---|---|---|---|---|---|---|
| | | | | | ° C. | Percent | |
| Methanol | −97.8 | 64.5 | 0.792 | ∞ | 0 | 38 | 1.20 |
| Carbitol [1] | | 202 | 0.990 | ∞ | 0 | 26 | 1.37 |
| Methyl Cellosolve | | 124.3 | 0.966 | ∞ | 0 | 22 | 1.33 |
| Ethyl sulfate | −26 | 208 | 1.18 | 2 | 0 | 21 | 1.32 |
| | | | | | 25 | 37 | 1.32 |
| Acetic anhydride | −73 | 139.6 | 1.082 | 10.3 | 0 | 12 | 1.33 |
| | | | | | 25 | 22 | 1.33 |
| Acetonitrile | −41 | 82 | 0.783 | ∞ | 25 | 19.5 | 1.32 |
| Methyl carbitol | | 193 | 1.035 | ∞ | 25 | 15 | 1.35 |
| Ethylene chlorohydrin | −69 | 128.8 | 1.213 | ∞ | 25 | 12 | 1.34 |
| Nitromethane | −29.2 | 102 | 1.139 | 9 | 25 | 8.7 | 1.34 |

[1] Diethylene glycol monoethyl ether. Some commercial lots of "carbitol solvent" contain ethylene glycol, which makes it less suitable for this purpose.

It will be observed that these solvents are possessed of sufficiently great water solubility to permit of separation from the extract by water treatment in those cases where separation by distillation is not indicated. It is with this understanding of the term that they are defined as water soluble.

All the compounds recommended have high dielectric constants, most of them having a dielectric constant of at least 20.

All the recommended solvents are acyclic.

In general acyclic organic compounds, soluble in water, possessed of high dielectric constants, may be used for solvent separation between isomeric paraffinic hydrocarbons having differing degrees of branched chain constitution.

Specifically, for the separation of triptane from its isomers, it is preferred to use materials of the "carbitol" type, particularly ethyl carbitol, i. e., diethylene glycol mono ethyl ether.

I claim:

1. A method of separating triptane from a mixture containing triptane and less highly branched isomers thereof which comprises contacting the mixture with diethylene glycol monoethyl ether under conditions appropriate for the preferential solution of triptane in the reagent, permitting phase separation into an extract phase rich in triptane and a raffinate phase less rich in triptane than the starting mixture, separating the extract phase, and removing said diethylene glycol monoethyl ether therefrom to give a triptane concentrate.

2. A method of separating triptane from a mixture containing triptane and less highly branched isomers thereof which comprises contacting the mixture with diethylene glycol monomethyl ether under conditions appropriate for the preferential solution of triptane in the reagent, permitting phase separation into an extract phase rich in triptane and a raffinate phase less rich in triptane than the starting mixture, separating the extract phase, and removing said diethylene glycol monomethyl ether therefrom to give a triptane concentrate.

3. A method of separating triptane from a mixture containing triptane and less highly branched isomers thereof which comprises contacting the mixture with diethylene glycol ether under conditions appropriate for the preferential solution of triptane in said diethylene glycol ether, permitting phase separation into an extract phase rich in triptane and a raffinate phase less rich in triptane than the starting mixture, separating the extract phase, and removing said diethylene glycol ether therefrom to give a triptane concentrate.

4. A method for separating isomeric paraffin hydrocarbons of different degrees of branched-chain constitution and boiling within a narrow range which comprises contacting a mixture containing isomeric paraffin hydrocarbons having different degrees of branched-chain constitution with an acyclic solvent in which the hydrocarbon isomer with the greatest number of branches in the chain is preferentially soluble, said solvent having a dielectric constant of at least 20 and being appreciably more water soluble than said preferentially soluble paraffin hydrocarbon, stratifying the mixture into an extract phase comprising solvent and preferentially soluble isomer and a raffinate phase relatively poorer in said preferentially soluble isomer than the starting mixture containing said isomers, separating said extract phase, and separating solvent from dissolved isomer.

5. A method for separating triptane from less highly branched isomers thereof which comprises contacting a paraffinic hydrocarbon mixture comprising essentially triptane and less highly branched isomers thereof with an acyclic solvent having a dielectric constant of at least 20 in which triptane is preferentially soluble, forming the so-obtained mixture into a raffinate phase poorer in triptane than the said paraffinic hydrocarbon mixture and an extract phase containing triptane, separating said extract phase from said raffinate phase, and separating triptane from solvent.

6. A method for separating isomeric paraffin hydrocarbons of different degrees of branched-chain constitution and boiling within a narrow range which comprises contacting a narrow boiling range mixture containing essentially isomeric paraffins having different degrees of branched-chain constitution with diethylene glycol monoethyl ether under conditions appropriate for the preferential solution of more highly branched-chain paraffins in said diethylene glycol monoethyl ether, establishing phase separation into an extract phase rich in more highly branched-chain paraffins and a raffinate phase less rich in more highly branched-chain paraffins than the starting mixture, separating the extract phase, and removing said diethylene glycol monoethyl ether therefrom to give a concentrate of more highly branched-chain paraffins.

7. A method for separating isomeric paraffin hydrocarbons of different degrees of branched-chain constitution and boiling within a narrow range which comprises contacting a narrow boiling range mixture containing essentially isomeric paraffins having different degrees of branched-chain constitution with acetic anhydride under conditions appropriate for the preferential solution of more highly branched-chain paraffins in said acetic anhydride, establishing phase separation into an extract phase rich in more highly branched-chain paraffins and a raffinate phase less rich in more highly branched-chain paraffins than the starting mixture, separating the extract phase, and removing said acetic anhydride therefrom to give a concentrate of more highly branched-chain paraffins.

8. A method for separating isomeric paraffins of different degrees of branched-chain constitution which comprises contacting a narrow boiling range mixture consisting essentially of paraffin hydrocarbons of different degrees of branched-chain constitution with an acyclic solvent having a dielectric constant of at least 20 and being appreciably more water-soluble than the paraffins to be extracted under conditions appropriate for the preferential solution of more highly branched-chain paraffins in said solvent, forming an extract phase rich in more highly branched-chain paraffins and a raffinate phase less rich in more highly branched-chain paraffins than the starting mixture, separating the extract phase, and removing said solvent therefrom to provide a concentrate of more highly branched paraffins.

ALFRED W. FRANCIS.